March 17, 1942.  T. R. TURNER  2,276,601
WAGON BRAKE ASSEMBLY
Filed March 24, 1941  2 Sheets-Sheet 1
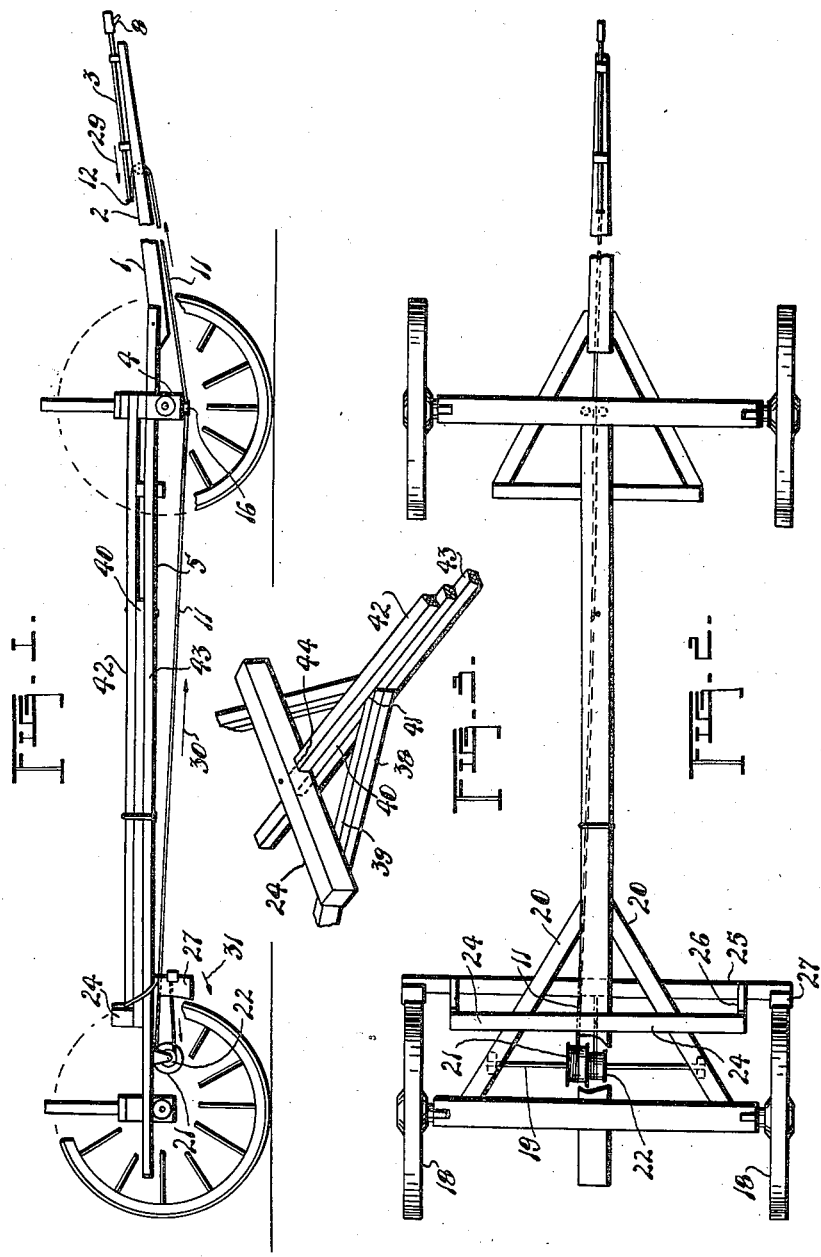
Applicant:
T. R. Turner.
Featherstonhaugh & Co
Atty's.

March 17, 1942.　　　T. R. TURNER　　　2,276,601
WAGON BRAKE ASSEMBLY
Filed March 24, 1941　　　2 Sheets-Sheet 2
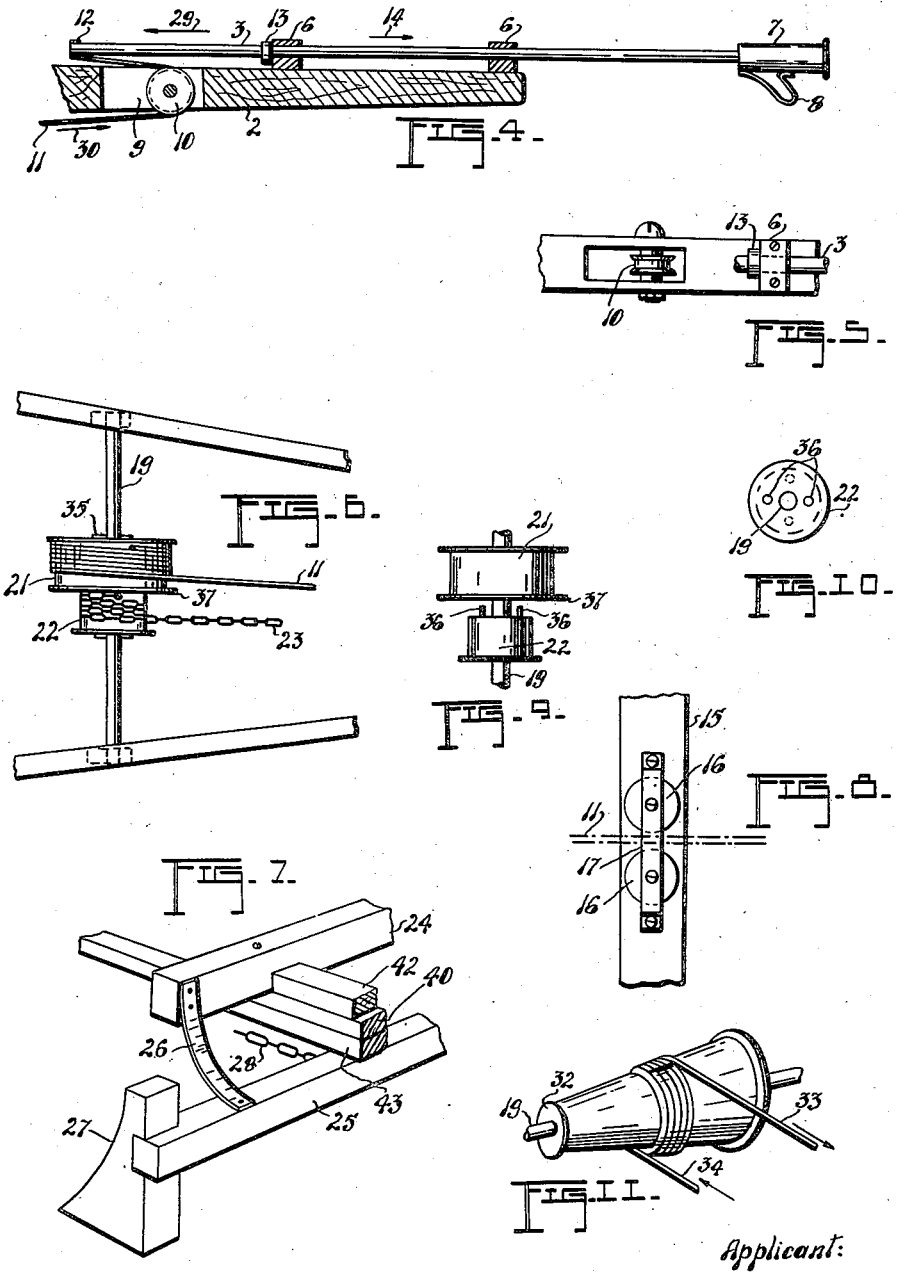
Applicant:
T. R. Turner.

Patented Mar. 17, 1942

2,276,601

UNITED STATES PATENT OFFICE 2,276,601

WAGON BRAKE ASSEMBLY

Thomas Rolf Turner, Kelowna, British Columbia, Canada

Application March 24, 1941, Serial No. 384,900

3 Claims. (Cl. 188—115)

My invention relates to an improved brake assembly for horse drawn wagons, an object thereof being to provide means for preventing a wagon from travelling too fast downhill and consequent danger to the horses thereby.

A further object of my invention is to provide means whereby the backward effort of the horses applies the brakes on the wheels of the wagon, exerting a far greater force than could be accomplished by means of a brake operated by the teamster.

A further object of my invention is to provide a device of the character herewithin described by the use of which, the teamster is left with both hands free to work the team without having to be concerned with a hand or foot brake.

A further object of my invention is to provide a device of the character herewithin described which can readily be adjusted to lengthening or shortening the reach of the wagon.

A further object of my invention is to provide in a device of the character described a pair of cable wound drums of different diameter and operatively connected to each other, a cable connected at the forward end thereof to a pole or draw bar being wound upon the large drum, a cable or chain connected to brake shoes being wound upon the smaller drum, the two drums therefore providing a reduction system by means of which the force exerted upon said brake shoes may be increased.

A further object of my invention is to provide a device of the character herewithin described which is inexpensive to manufacture, easy to install, and which cannot readily become out of order.

With the above more important objects in view and such other minor objects as may appear as the specification proceeds, my invention consists essentially in the arrangement and construction of parts all as hereinafter more particularly described, reference being had to the accompanying drawings, in which:

Figure 1 is a side section of a wagon equipped with my brake assembly.

Figure 2 is a plan view of a wagon equipped with my brake assembly.

Figure 3 is a perspective detail illustrating the means by which I strengthen the hounds and reach of a wagon equipped with my braking assembly.

Figure 4 is a detail illustrating my two-part pole.

Figure 5 is a plan detail illustrating the pulley located in a mortice within the primary shaft of my two-part pole.

Figure 6 is a plan detail illustrating specifically the adjacent drums upon which my cable and brake-shoe chain are wound.

Figure 7 is a perspective detail illustrating the manner in which my brake beam is hung.

Figure 8 is an underside plan detail illustrating the rollers whereby my braking cable is held on centre beneath the front truck.

Figure 9 is a detail illustrating the drums of Figure 8 separated for the purpose of lengthening or shortening the cable extending to my pole.

Figure 10 is a detail illustrating the locations of the several studs in my chain drum, designed to engage recesses in my cable drum.

Figure 11 is a perspective detail illustrating a cable drum in which one end of the cable is attached to my pole and the other to my brake beam.

In the drawings like characters of reference indicate corresponding parts in the different figures.

It is well known that when a heavily loaded wagon is travelling downhill behind a team of horses, there is always the possibility that the weight of the wagon will cause the horses to stumble and fall, particularly during inclement weather conditions. Handbrakes and foot-brakes have been incorporated in certain makes of wagon, but obviously, the power which can be applied by these against a wagon wheel rim, must vary with the strength of the teamster, and in any event, is inconsiderable in comparison with the power which can be exerted by a team of horses in opposition to a downhill travelling wagon.

Accordingly, and referring to the accompanying drawings my invention consists in the provision of a two-part pole 1 of which the two principal parts comprise a primary shaft 2 and a secondary shaft 3, the primary shaft being connected to the front truck 4 of a wagon 5 in the conventional manner, while the shaft 3 is slidably held in bearing 6 and projects beyond the front end of the wagon, terminating in any suitable head 7 carrying a conventional hold-back bracket 8.

Within a mortice 9 in the primary shaft 2 is a pulley 10 around which passes a cable 11, the end of which is secured to the rear end 12 of my secondary shaft 3 and it will be seen that the collar 13 limits the endwise movement of the shaft 3 in the direction of the arrow 14.

The cable 11 extends rearwardly beneath the front truck 4 of the wagon and is centred beneath the axle 15 thereof by means of a pair of horizontally disposed rollers 16 mounted in a bracket 17. By means of this arrangement, it will be recognized that the cable will always be centered beneath the axle 15 irrespective of the amount by which the front truck is rotated when the wagon is turning.

Suitably positioned between the rear wheels 18 is a shaft 19, the same being shown as spanning the hounds 20 in the accompanying Figure 2. Upon this shaft is journalled a pair of adjacent drums 21 and 22 of which the drum 21 has a circumference substantially larger than that of the drum 22, the end of my cable 11 being anchored to the drum 21 while a chain 23 is anchored to the drum 22.

Suspended from a beam 24 somewhat in advance of the drums 21 and 22, is my brake beam 25, the same being hung from the beam 24 by means of the arcuate spring hangers 26. To the ends of the beam 25 are secured my brake blocks 27, these being in alignment with, and designed to engage the tires of the wheels 18 but being normally held spaced therefrom by the resiliency of the hangers 26 as illustrated in the accompanying Figure 1.

The end 28 of the chain 23 is secured to the beam 25 and by reference to the accompanying plan view Figure 6, it will be seen that while the cable 11 is wound clockwise on the drum 21 (considered from the end at which it is anchored), the chain 23 is wound counterclockwise upon the drum 22 (considered from the end at which it is anchored). Accordingly it will be seen that the cable 11 leaves the drum upon the topside thereof while the chain 23 leaves the drum 22 on the underside thereof.

From the foregoing it will clearly be understood that when a team exerts a force backwardly against the wagon and in opposition to the direction that the wagon tends to travel, the conventional neckyoke ring bears against the bracket 8 and thus moves the shaft 3 in the direction of the arrows 29 (Figures 1 and 4). Since the end 12 at which the cable 11 is anchored, is to the rear of the pulley 10, the cable will move in the direction of the arrows 30 (Figures 1 and 5) and tends to unwind from the drum 21.

This will have the effect of winding the cable 23 on the drum 22 which will move the brake beam 25 in an arc rearwardly as indicated by the arrow 31 (Figure 1) so that the shoes bind upon the wheel tires. As soon as this action is released, the flexibility of the hangers 26, causes the beam 25 to return to its previous position.

From the foregoing and from a consideration of Figures 1 and 6 particularly, it will be seen that the pair of drums which I employ coact to produce greater pressure upon the brake shoes than if one drum only or a pulley were employed. In fact, rotation by the cable 11 of the larger drum causes the latter to act as a lever upon the smaller drum.

In the accompanying Figure 11 it will be seen that I have shown only one drum 32, which, is of horizontal frusto-conical configuration, the same being mounted upon the shaft 19. In this instance it is to be understood that the cable as continued from 33 extends forwardly to the shaft 3 while the part leading from 34 leads to the brake beam 25. The frusto-conical surface gives the same reducing effect as is obtained by the large and small drums 21 and 22 and of course, it is to be understood that the steepness of the member 32 may be varied within wide limits. I have illustrated this embodiment to indicate that two drums are not essential and that one cable, on one drum can be utilized to carry out the object of this invention.

When it is desired to shorten or lengthen the reach of a wagon equipped with my braking assembly, the cable 11 has to be lengthened or shortened and accordingly, by particular reference to the accompanying Figures 6, 9, and 10, it will be seen that the drums 21 and 22 are separable and that each may be rotated independently when separated. If it is desired, for instance, to wind more cable onto the drum 21, because the reach has been shortened, this can readily be done by removing the pin 35, and in shifting the drum 21, which it will be seen is connected to the drum 22 by means of the projecting stud 36 which extend around the perimeter thereof. These engage with apertures in the side plate 37 of the drum and when sufficient additional cable has been wound onto the drum, it is end shifted back to its original position, the apertures in the plate 37 being brought into alignment with the nearest of the several studs 31 after which the pin 35 is reinserted.

In the accompanying Figures 1 to 3, it will be seen that I have strengthened the hounds and reach of a wagon equipped with my brake assembly as it will be recognized that when the brakes are applied powerfully, there is a tendency for the reach particularly, to be drawn downwardly in an arc. It may easily be strengthened against this however, by the arrangement now about to be described.

Upon the conventional hounds 38 I apply a pair of reinforcing hounds 39, these hounds diverging from and being in the plane of a reinforcing reach 40 which is secured to the end 41 of the reinforcing hound 39, and, at its rear end to the beam 24, which it will be seen, rests upon the reinforcing hounds 39.

On top of the beam 40 is an extra reach 42, secured at the front end thereof to the front truck as is the conventional reach 43.

When the wagon gear is shortened to its maximum, the rear end 44 of the reinforcing reach 42, will butt up against the beam 24 while the conventional reach 43 will extend away to the rear thereof. In this position the members 40, 42, and 43 will be suitably clamped and pinned but when it is desired to lengthen out the wagon gear, the clamps and pins will be removed. Even in the fully extended position it will be seen that the conventional reach 43 is always strengthened by the beam 40 at the rear end thereof and by the reinforcing reach 42 at the forward end thereof. In this way a highly satisfactory strengthening means is attained.

It will be noted that I have not shown any means whereby a wagon may be backed-up on level ground without the brakes being applied. However, there are so many simple ways of accomplishing this, that I do not consider the same amounts to invention. An obvious way would be to provide a dog on the shaft 3 designed to butt up against the forward end of the shaft 2 thus preventing the shaft 3 from travelling rearwardly. Such a dog could readily be operated by a line leading to the teamster's seat.

Since many modifications can be made in the invention herein described and since the accompanying drawings have been prepared only to illustrate the relative arrangement and interaction of parts and not with regard to accuracy of dimensions for manufacturing purposes which in view of this disclosure I consider to entail merely mechanical skill together with the skill of the mechanical draftsman, and since many apparently widely different embodiments of this invention may be made within the scope of the accompanying claims without departing from the spirit and scope of the same it is intended that all matter contained in the accompanying specification shall be interpreted as illustrative only and not in a limiting sense and I desire only such limitations placed thereon as justice dictates.

What I claim as my invention is:

1. A brake assembly for wagons, trailers and the like comprising in combination, a pair of brake-shoes, a pole or draw-bar, a pair of adjacent drums, a cable anchored at one end thereof to one of said drums and at the other end thereof to said pole or draw-bar, and a chain or cable anchored at one end thereof to the other of said drums and at the other end thereof to said brake-shoes, said drums being mounted upon a common shaft said drums being normally connected for rotation together but being separable for the purpose of varying the length of cable to be wound on said first mentioned drum in the adjustment of the reach of said wagon or trailer.

2. A brake assembly for horse drawn wagons comprising in combination, a pair of brake-shoes, a two-part pole, and a pair of adjacent drums, a cable around one of said drums and a chain or cable around the other of said drums, said two-part pole comprising a primary shaft connected to the front truck of said wagon and a secondary shaft projecting forwardly beyond the end of said primary shaft, said secondary shaft being slidably mounted upon said primary shaft, said cable being secured at one end thereof to one of said drums, a pulley mounted upon said primary shaft in advance of the rear end of said secondary shaft, said cable passing around said pulley and being secured at one end to the rear end of said secondary shaft and at the other end to one of said drums, said chain or cable being secured to one end of the other of said drums and at the opposite end to said brake-shoes, said drums being mounted upon a common shaft and normally connected for rotation together but being separable for the purpose of varying the length of cable to be wound thereon in the adjustment of the reach of said wagon.

3. A brake assembly for wagons, trailers and the like, comprising in combination, a pair of brake-shoes, a pole or draw-bar, a primary drum and a secondary drum, said drums being connected for rotation together upon a common shaft, said primary drum being of greater diameter than said secondary drum, a cable anchored at one end thereof to said primary drum and being secured at the other end thereof to said pole or draw-bar, and a cable anchored at one end thereof to said secondary drum and at the other end thereof to said brake-shoes, said cables being wound in opposite directions upon their respective drums so that the unwinding of the cable on said primary drum will cause the cable to wind on said secondary drum.

THOMAS ROLF TURNER.